(12) United States Patent
Anderson et al.

(10) Patent No.: US 6,845,333 B2
(45) Date of Patent: Jan. 18, 2005

(54) PROTECTIVE RELAY WITH SYNCHRONIZED PHASOR MEASUREMENT CAPABILITY FOR USE IN ELECTRIC POWER SYSTEMS

(75) Inventors: Luth r S. Anderson, Pullman, WA (US); Armando Guzman-Casillas, Pullman, WA (US); Gregory C. Zweigle, Pullman, WA (US); Gabriel B nmouyal, Boucherville (CA)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 10/729,135

(22) Filed: Dec. 5, 2003

(65) Prior Publication Data

US 2004/0093177 A1 May 13, 2004

Related U.S. Application Data

(63) Continuation of application No. 10/124,858, filed on Apr. 17, 2002, now Pat. No. 6,662,124.

(51) Int. Cl.$^7$ ............................................. G06F 19/00
(52) U.S. Cl. ..................................... 702/65; 324/76.11
(58) Field of Search ............................. 702/65, 58, 35, 702/36, 38, 39, 64, 188, 189, 182, 184; 324/76.11–76.15, 76.19, 9, 21, 72.5, 713; 700/22, 9, 21; 361/1–6, 31–32, 78–79, 115, 191

(56) References Cited

U.S. PATENT DOCUMENTS

| | | | | |
|---|---|---|---|---|
| 4,829,298 A | * | 5/1989 | Fernandes | 340/870.27 |
| 5,006,846 A | * | 4/1991 | Granville et al. | 340/870.28 |
| 5,224,011 A | * | 6/1993 | Yalla et al. | 361/93.2 |
| 5,498,956 A | * | 3/1996 | Kinney et al. | 324/142 |
| 5,592,393 A | * | 1/1997 | Yalla | 700/293 |
| 6,236,949 B1 | * | 5/2001 | Hart | 702/64 |
| 6,446,682 B1 | * | 9/2002 | Viken | 141/59 |

* cited by examiner

Primary Examiner—Edward Raymond
(74) Attorney, Agent, or Firm—Cook, Alex, McFarron, Manzo, Cummings & Mehler, Ltd.

(57) ABSTRACT

The relay system obtains voltage and current values from a power line and uses a first sampling element to sample the voltage and current values at selected intervals of time. The resulting sampled signals are used for power system-wide protection, control, monitoring and metering. The sampled signals are then resampled at a rate which is a selected multiple of the power system frequency. The results of the resampling are used by processing circuitry for protection functions including fault determinations.

22 Claims, 5 Drawing Sheets

```
=>>MET PM 6:05
Synchronized Phasor Measurement Data Will be Displayed at  6:05:00.000
=>>

Relay 1                                        Date: 01/01/2002 Time: 06:05:00.000
Station A                                      Serial Number: 0000000000

Synchrophasors       Phase Currents                       Phase Voltages
              IA          IB          IC          VA          VB          VC
MAG (A/KV)  199.429     201.079     201.392     132.775     132.800     132.784
ANG (DEG)  -134.82      104.69      -14.94      150.00       30.01      -89.99

Pos. Sequence Current (A)           Pos. Sequence Voltage (KV)
                    I1                                    V1
MAG              200.632                              132.786
ANG (DEG)       -135.01                               150.00

FREQ (Hz)         59.99

PSV57   PSV58   PSV59   PSV60   PSV61   PSV62   PSV63   PSV64
  0       0       0       0       0       0       0       0
=>>
```

PROTECTIVE RELAY WITH SYNCHRONIZED PHASOR MEASUREMENT CAPABILITY FOR USE IN ELECTRIC POWER SYSTEMS

This is a continuation of U.S. patent application Ser. No. 10/124,858 filed on Apr. 17, 2002 Now U.S. Pat. No. 6,662,124.

TECHNICAL FIELD

This invention relates generally to the monitoring and protection of electric power systems, and more specifically, concerns a power system relay apparatus which is capable of monitoring system-wide performance, such as with voltage and current oscillography and harmonic analysis and voltage/current synchronized phasor measurements, while also providing protection functions, such as line distance protection for fault determinations.

BACKGROUND OF THE INVENTION

Heretofore, system-wide power monitoring functions, which include system control as well as disturbance analysis and harmonic frequency analysis, for example, require sampling of the data from the power line referenced to time, either a local time clock or an absolute time reference, such as from a global positioning system. Digital fault recorders, for instance, require data (current and voltage values) from the power line at fixed time intervals to carry out voltage and current oscillography and harmonic analysis. Typical sampling rates are 1000 (1 k) samples per second or faster, with sampling being synchronized, as indicated above, to an internal clock or an external time source.

On the other hand, many power system protection functions, such as line distance protection algorithms, require sampling at multiples of the power system operating frequency (typically 60 Hz), to avoid phasor measurement errors. Phasors used by the protection algorithms are developed from the voltage and current values but can contain significant errors where the system frequency is other than nominal. Protective relays determine the power system operating frequency and use that frequency information to produce a sampling frequency which is a selected multiple of the operating frequency. This arrangement reduces possible errors in phasor calculations to a minimum; however, the resulting phasor measurements are not referenced to absolute time, so that synchronized phasor measurement applications to an entire power system are not possible.

As an alternative to the above-described systems, the power system operating frequency, once obtained, can be used to modify the coefficients of digital bandpass filters which are used to filter the sampled input data. Such a system provides information suitable for some protection functions, but also, since the original input data is sampled via a time-based clock (either internal or external) to provide an oscillography and harmonic analysis capability, it does not have a common i.e. absolute, time reference for the multiple protective relays and other protective devices located at different points in the power system. Accordingly, such a system is not suitable for those protective applications which require synchronized phasor measurements.

It is thus desirable to have a single, comprehensive system capable of producing synchronized phasor values, including such values capable of being used for system-wide control and disturbance analysis, as well as line protection functions within a single power system relay device.

SUMMARY OF THE INVENTION

Accordingly, the present invention is a protective relay for electric power systems for system-wide control and analysis and for protection, comprising: acquisition circuits for obtaining at least one of the following: (1) voltage values and (2) current values from a power line; a first sampling circuit for sampling said voltage and/or current values at selected intervals of time; a first calculation system using the resulting sampled values to perform selected power system-wide control and analysis determinations; a frequency estimating circuit for determining the power system frequency; a second sampling circuit for resampling the sampled voltage and/or current values at a rate which is related to the power system frequency; and a second calculation system using the resampled voltage and current values to perform selected protection functions for the portion of the power line associated with the protection relay.

BEST MODE FOR CARRYING OUT THE INVENTION

Figure 1:
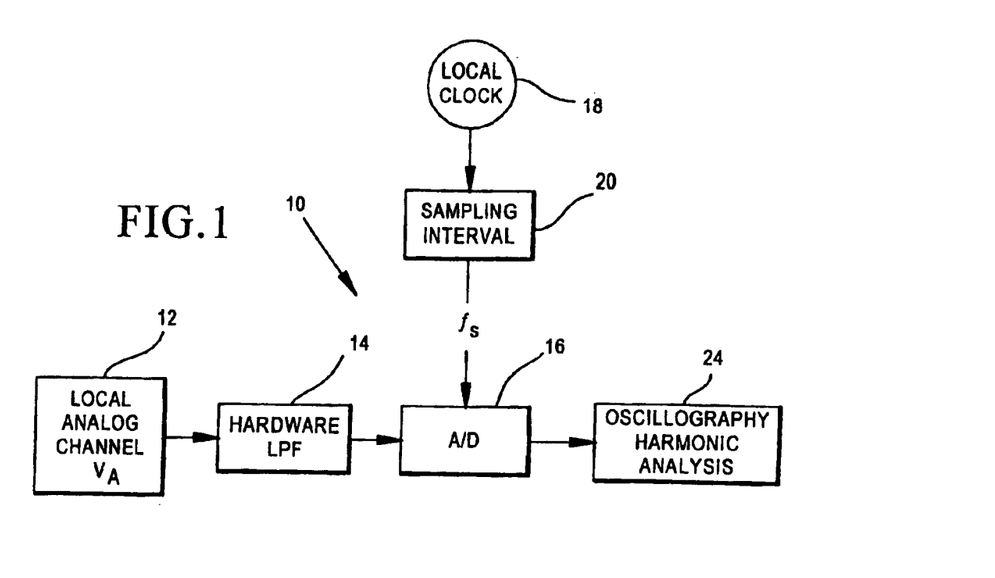
FIG. 1 is a block diagram showing a prior art time-based sampling apparatus for electric power system recorders, such as digital fault recorders.

As discussed above, certain power system monitoring devices such as digital fault recorders, acquire analog voltage and current values from the power line at fixed time intervals in order to carry out voltage and current oscillography analysis as well as harmonic analysis on the entire power system. Such a system is shown generally at 10 in FIG. 1, with a source of voltage $V_A$ shown at 12. Typically, the analog data will include all three voltage phases and all three current phases from the power line.

The analog signal $V_A$ (at a suitable magnitude level, provided by a voltage transformer) is directed to a low pass filter 14 and then to an A-D converter 16. This is conventional. A local clock source 18 in FIG. 1 operating at a specific selected sampling interval (block 20) samples the A-D converter 16 at a selected rate, e.g. 8000 samples per second. The resulting time-sampled signal is sent to a conventional processing system 24 for oscillography and harmonic analysis. Since the time-sampled data preserves the frequency information of the power system, analysis of the power system frequency excursions can be performed during power system disturbances.

Figure 1A:
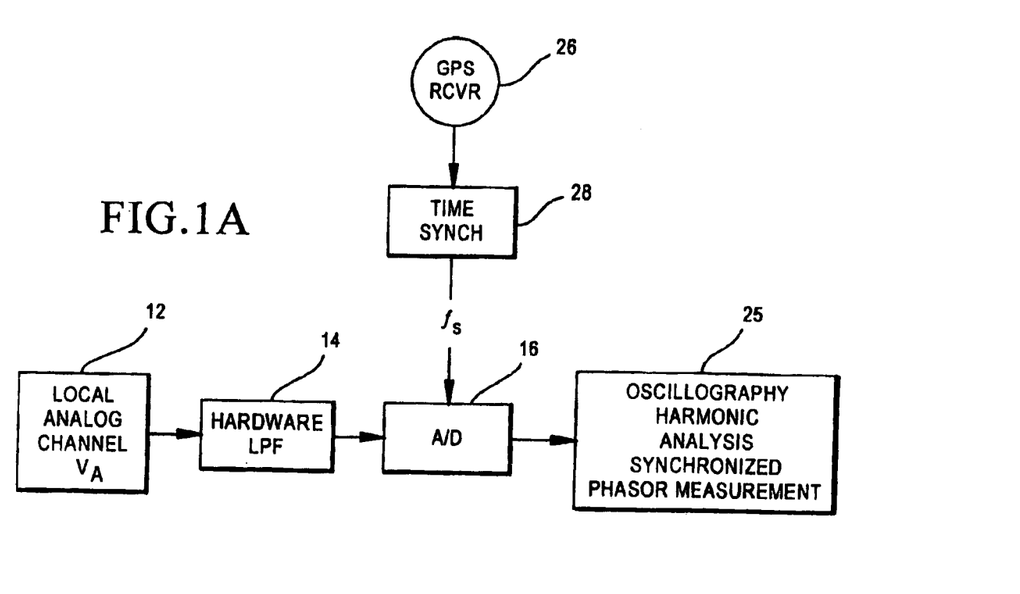
FIG. 1A is a diagram similar to that of FIG. 1, using a global positioning receiver to provide an absolute time reference.

The system of FIG. 1A provides synchronized phasor values (in addition to oscillography and harmonic analysis) by processor 25 when an absolute time reference is used, instead of a local clock, such as from a GPS (global positioning system) reference 26 in communication with a time synchronization system. The use of these synchronized phasor measurements or values, also referred to as synchrophasor measurements, will be discussed in more detail below.

Figure 2:
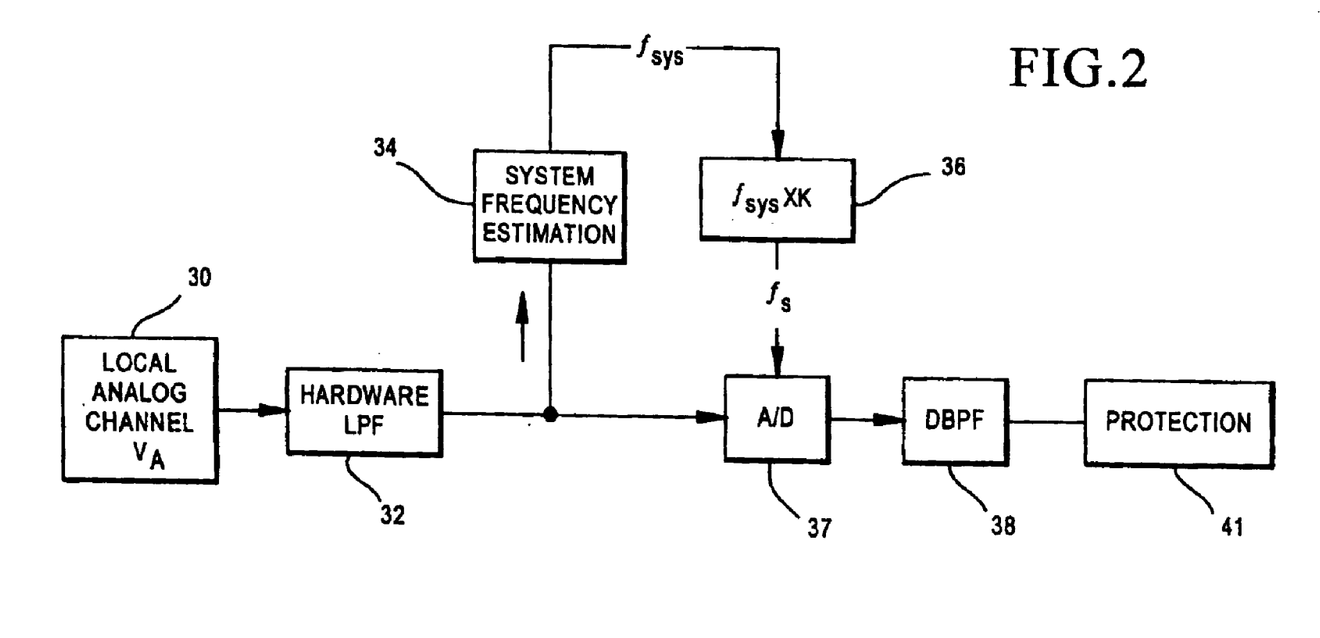
FIG. 2 is a block diagram of a prior art system using sampling at multiples of the power system operating frequency for electric power system relays.

Sampling the input data at constant time intervals is typically not used for protection functions, such as line distance protection, because it can introduce errors in the protection functions. Also, as briefly discussed above, traditional line distance protection requires sampling at some multiple of the power system operating frequency. Referring to FIG. 2, data from the power line 30, such as phase A voltage ($V_A$) from a voltage transformer, is applied to a low pass filter 32. A system frequency estimation circuit 34 obtains the system frequency from the output of the low pass filter to develop a power system operating frequency ($f_{SYS}$). This frequency information is multiplied by a factor k at 36 to obtain the system sampling frequency $f_s$, which is applied to the A/D converter 37. Many types of frequency estimation circuits can be used in the present system. One example is discussed in the following reference: *A New Measurement Technique for Tracking Voltage Phasors, Local System Frequency and Rate of Change of Frequency*, Phadke et al, IEEE Transactions on Power Apparatus and Systems, Vol. PAS-102 No. 5, May 1983. The sampled data from the A-D converter 37 is passed through a digital bandpass filter 38. The output from the bandpass filter is applied to conventional protection processor circuitry 41.

The disadvantage of the system of FIG. 2 is that the phasor measurements have no absolute time reference, which is necessary for synchronized phasor measurement applications. The system thus does not have the time synchronization necessary for system-wide monitoring, metering, protection and control functions.

Figure 3:
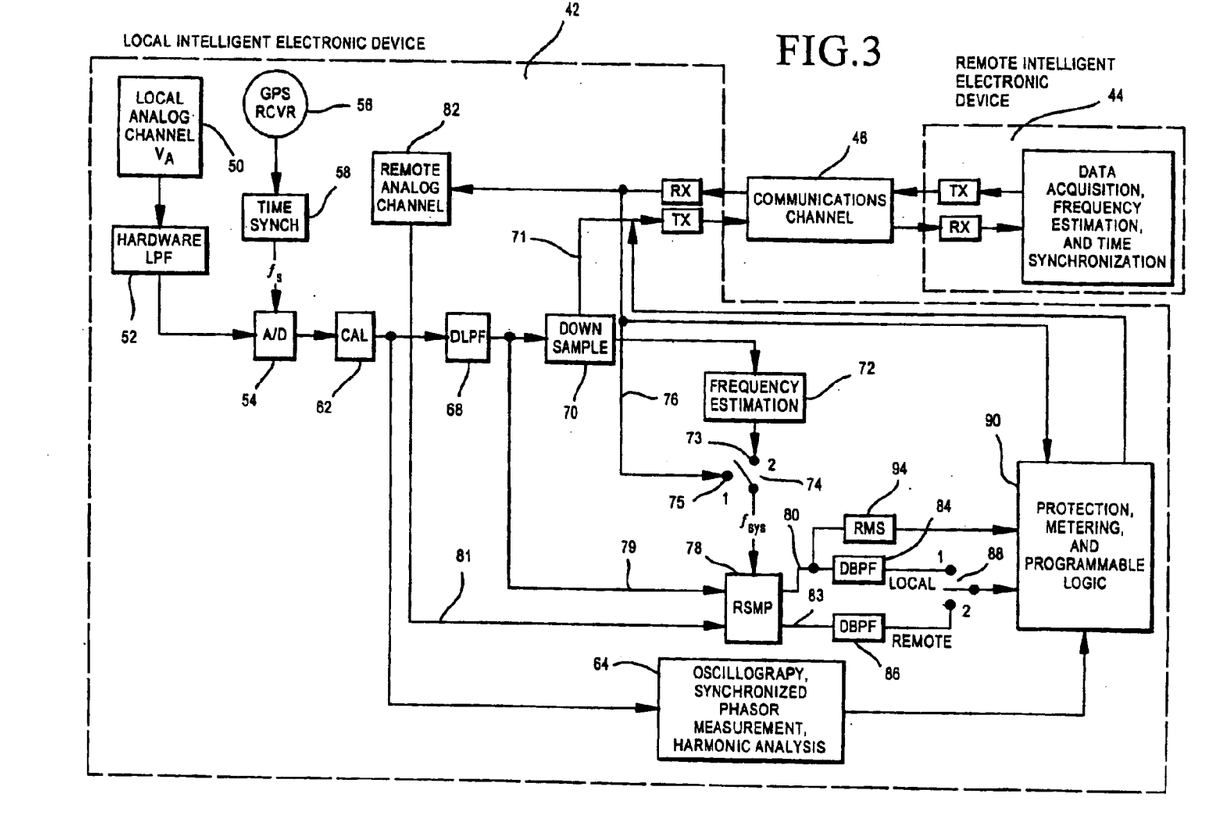
FIG. 3 is a block diagram of the system of the present invention.

FIG. 3 shows the system of the present invention, which produces synchronized phasor values (measurements), which are independent of system frequency, and which hence can be used for certain system-wide protection functions. System-wide protection, monitoring, metering and control functions, including oscillography and harmonic analysis of FIGS. 1 and 1A, can be accomplished from the time-based sampling for time-based applications using synchrophasors. In addition, the input signals are resampled at multiples of the power system operating frequency to provide a typical range of protection functions, such as line distance protection and fault determinations.

FIG. 3 includes a local protection apparatus or device 42, also referred to as an intelligent electronic device, such as a protective relay, and a remote apparatus 44. The remote apparatus is identical to the local apparatus and the two communicate with each other over a communications channel 46. The description below concerns the structure and operation of the local device; the same description is applicable to the remote apparatus 44.

In more detail, data is acquired from the power line, typically, three phases of current ($I_A$, $I_B$ and $I_C$) and three phases of voltage ($V_A$, $V_B$ and $V_C$). Only $V_A$ is shown in FIG. 3 for purposes of simplicity of explanation. Element 50 includes conventional transformer devices (voltage transformers/current transformers) which reduce the current and/or voltage values to a level appropriate for use in a microprocessor-based protective relay 42. A typical voltage output of element 50 will be approximately 1.34 volts under normal operating conditions.

The output from element 50 is applied to a low pass filter 52, the output of which is applied to an A-D converter 54. The acquired data is sampled at fixed timed intervals. The sampling signal is referenced to an external clock signal, such as from a GPS receiver 56, which is an absolute time reference. The output from the GPS receiver 56 is applied to a time synchronization element 58. To produce synchronized phasor measurements, such an absolute time reference is required. The resulting sampled output from the A-D converter is applied to a calibration circuit 62, which accounts for any data acquisition errors which may occur in the data acquisition hardware, so that the data is aligned between devices 42 and 44. The output of the calibration circuit 62, which is typically provided at a relatively high sampling rate, for example, 8000 samples per second, is applied to a processing circuit 64 for conventional oscillography and harmonic analysis applications.

In addition, however, synchronized phasor values are determined from the power line input voltage and current values. The synchronized phasor output of circuit 64 is independent of system frequency, and can be used in certain protection functions carried out by the local apparatus 42.

The determination of synchronous phasor values per se is known, as set forth in a paper entitled "Measurement of Voltage Phase for the French Future Defense Team Plan Against Loss of Synchronism" at IEEE TRANSACTIONS ON POWER DELIVERY, Vol. 7, No. 1, January 1992. The algorithm in processing circuit 64 uses the input values $V_A$, $V_B$, $V_C$, and $I_A$, $I_B$, $I_C$, at 8000 samples per second, with an absolute time reference. The processor 64 decimates, i.e. decreases, the number of samples, dividing by eight, to create voltage and current signals at 1000 (1 k) samples per second. Next, each input signal is multiplied by the reference signals $\cos(2\pi t+\beta.)$ and $\sin(2\pi t+\beta.)$ where time t is the absolute time reference and $\beta$ is a calibration adjustment for the particular hardware used. In the next step, the multiplied signals are demodulated with a low-pass filter to obtain the real and imaginary parts of the $V_A$, $V_B$, $V_C$, and $I_A$, $I_B$, $I_C$ phasors. The relay calculates these particular phasors every 50 milliseconds.

Next, the processor uses the angle information from the $V_A$ phasor calculation in the above step and the magnitude calculations from the filtered quantity $V_{AF}$ (the filtered fundamental A-phase voltage quantity) to produce the A-phase voltage synchrophasor ($V_{Async}$). The relay performs similar calculations for the other phasors. Each resulting synchrophasor is associated with a particular time mark, referred to as time-sync. This time mark is referenced to absolute time.

Then the positive sequence quantities (e.g. $V_{1sync}$) are then computed from the three-phase current and voltage synchrophasors as follows:

$$V_{1sync}=(1/3)\ (V_{Async}+aV_{Bsync}+a^2V_{Csync})$$

$$I_{1sync}=(1/3)\ (I_{Async}+aI_{Bsync}+a^2I_{Csync})$$

Where a=1 at an angle 120°. An alternative to the positive sequence voltage, referred to as Alpha Clarke components, for protection calculations is as follows:

$$V_{alphasync}=(2/3)\ (V_{Async}-V_{Bsync}/2-V_{Csync}/2); \text{ and}$$

$$I_{alphasync}=(2/3)\ (I_{Async}-I_{Bsync}/2-I_{Csync}/2)$$

The protection functions which use the synchronized phasor measurements, such as the synchronized positive sequence phasor values, include current differential protection, in which current values from a local device, such as device 42, are used with current values from a remote device, such as device 44, to provide the protection function. The absolute time reference for the synchrophasors provides the ability to carry out such protection functions and make fault determinations. Although synchronized phasor measurements are known per se, as indicated by the above reference, the application of synchronized phasors in a protective relay for line distance protection is not heretofore known. Hence, system-wide analysis capability as well as some protection functions are available from the processing circuit 64 alone.

Referring again to FIG. 3, the output of the calibration circuit 62 is also applied to a digital low pass filter 68, the output of which is applied to a "down" sampling device 70, which decimates, i.e. divides the number of samples, such as down to 1000 samples per second from 8000 samples per second. The down sampled data is applied to the remote device 44 on transmit line 71 over a communications channel 46 at a rate which is suitable for the bandwidth of the communications channel. The down sampled data output is also applied to a conventional frequency estimator 72, which can be any of several known devices, as discussed above. Frequency estimator 72 will provide an estimate as to the actual frequency of the power line signal.

The output of frequency estimator circuit 72 is applied to one input 73 of a two position switch 74. The other input 75 is the transmitted data from the remote device, on receive line 76 from communications channel 46. The inputs to the switch 74 thus are local and remote power signal frequency information. The output of switch 74 is applied as the sampling signal $f_{sys}$ to a resampling circuit 78. There are two data inputs to resampler 78, one on line 79 from the output of the digital low pass filter 68 of local device 42 (the local signal) and the other on line 81 from the remote device via the remote channel 82 (the remote signal).

Both of these input signals are resampled at a frequency which is a selected multiple of the operating system frequency, e.g. $32 \cdot f_{sys}$ in the embodiment shown. Other multiples could be used. The local and remote resampled data appear on output lines 80 and 83, respectively. These signals are then applied through digital bandpass filters 84 and 86. A switch 88 controls the application of either the local or remote frequency sampled data to a conventional protection, metering and programmable logic circuit 90. The selection between the two depends upon the requirements of the programmable logic relative to the particular protection function.

The local resampled data is also processed at 94 to produce an RMS (root-mean-square) value. This RMS data is used for metering and protection applications for the relay. The output of the circuit 90 is applied to the remote device over communications channel 46, while similar information from the remote device is applied to the protection circuit 90 to implement protection functions and to produce fault indications and to trip a circuit breaker, when appropriate, for that portion of the power system covered by the relay.

The system of FIG. 3 in a single device provides an oscillography and harmonic analysis capability because of the time-based sampling as well as protection and metering functions using samples based on multiples of system frequencies. The apparatus thus has a comprehensive protection, monitoring, metering and control capability. The use of an absolute time reference, such as a GPS receiver, permits the generation of synchronized phasor (synchrophasor) values, which are used in the protection functions. The protection capability includes communication and coordination with remote devices.

Figure 4:
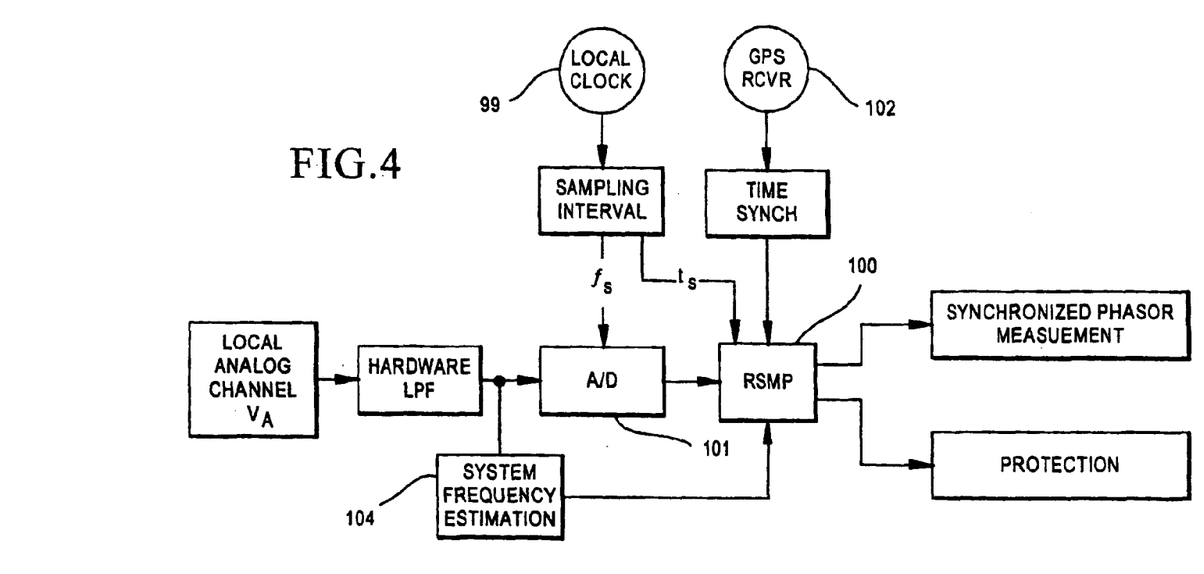
FIG. 4 is an alternative system to the system of FIG. 3.

A variation of FIG. 3 is shown in FIG. 4, in which the sampling of the input voltage and current data from the power line is based on a local clock signal from source 99, providing a sampling frequency $f_s$ for A-D converter 101, while a resampling circuit 100 uses an absolute time reference from a GPS receiver 102 to provide synchronized phasor values. The system frequency is also estimated by circuit 104 and applied to the resampler 100. The absolute time reference and the system operating frequency resample the data from A-D converter 101 at a specific frequencies, depending on the application. One frequency can be used for protection and another frequency can be used for synchrophasor measurement.

Figure 5:
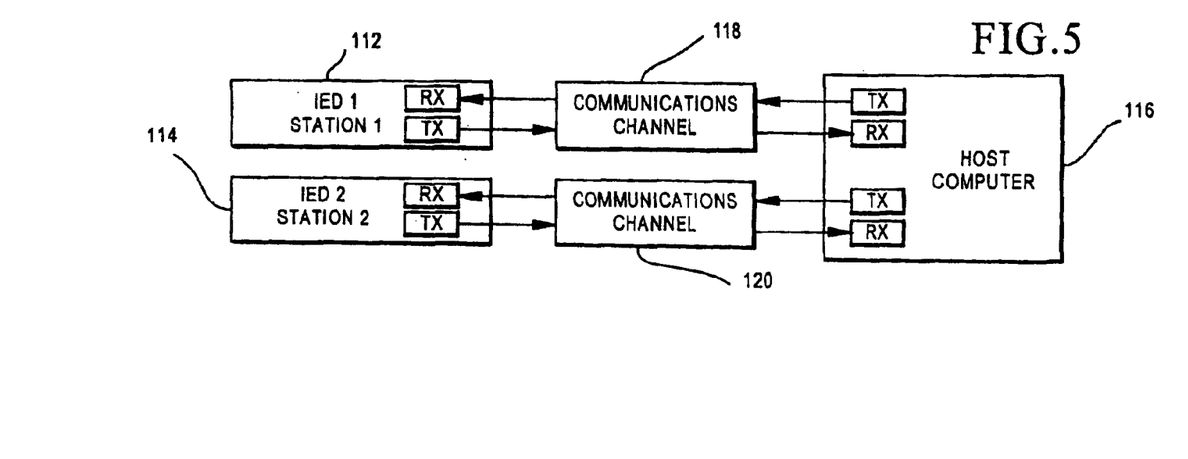
FIGS. 5–7 are diagrams showing various communication arrangements between a relay device and other units, including a host computer and/or another relay device, involving solicited and unsolicited messages.

Synchronized phasor measurement data from the device 42 of FIG. 3 can be reported in two different ways, unsolicited binary messages at specific time intervals and solicited ASCII messages at specific times. One example is shown in FIG. 5, where two devices (intelligent electronic devices, such as protective relays) 112 and 114 communicate with a host computer 116 over conventional communication channels 118 and 120, using a conventional CRC (cyclical redundancy check) error detection method.

Unsolicited binary messages from the IED's to the host computer 116 will typically contain the following data: the IED address that is used by the host computer to determine the data source; the sample number of the data; the data acquisition time stamp with the absolute time reference; the power system estimated frequency; the phase and positive sequence voltages and currents from the power line; an indication of correct time synchronization; a confirmation that the data packet is ok; followed by general purpose bits; and lastly, an error detection code. The host computer 116 will parse the received data from several different devices communicating with it in the network, according to the time stamp and the sample number in each data packet.

Figures 6, 7:
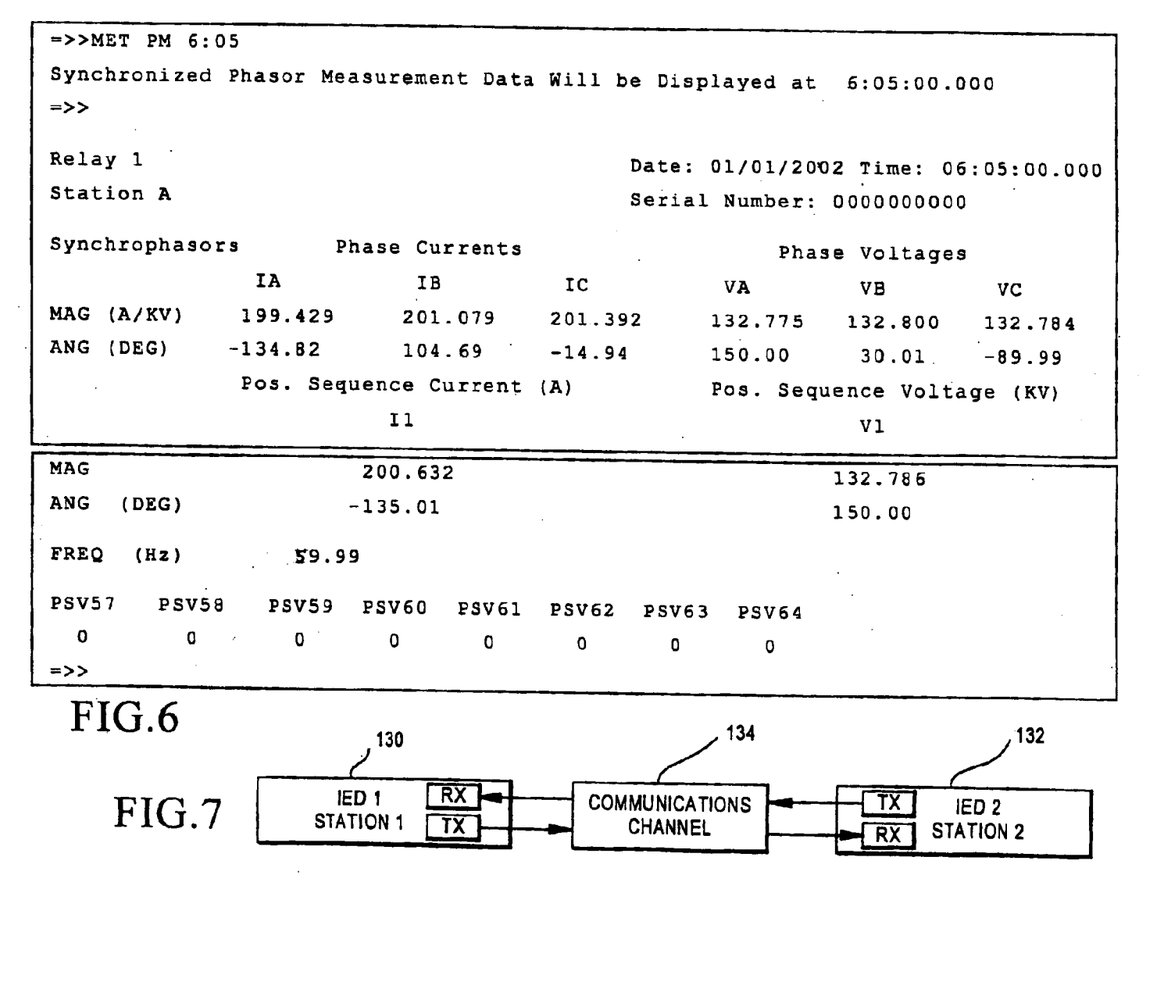

With solicited messages, the devices respond to a command from the host computer 116 relative to a phasor measurement by reporting synchronized phasor measurements of meter data (magnitude and angle for the three phase currents and voltages) in the power system at specific times. This arrangement is used to take "snapshots" of the synchrophasors at specific times across the entire power system, which, when put together, show the power system condition at all points in the system at one specific point in time. A sample report is shown in FIG. 6.

With relay-to-relay unsolicited binary messages (FIG. 7), a local relay 130 using unsolicited binary messages can use a remote relay 132 as a reference, with a communications channel 134. The data packet transmitted is similar to the unsolicited message shown in FIG. 6. The data packet contains one or more voltage and/or current values. Normally the positive sequence voltage is transmitted. The local device (relay) 130 uses the time stamp information to align the local and remote data packets. For example, the local angle information $ANG_{LOCAL}$ can be aligned with the remote angle $ANG_{REMOTE}$ to obtain the angle difference between the two ends of the line. This angle difference can then be used by the relay logic to perform control or protection functions, with fixed or programmable logic.

For those messages, such as the unsolicited binary messages described above, which use positive sequence voltage values determined from the synchronized phasor measurements as a reference, an alternative known as the Alpha Clarke voltage can be used. The Alpha Clarke voltage is a better reference choice than the positive sequence voltage because it is easier to calculate and hence reduces the relay-processing burden. The Alpha Clarke components are calculated as described above.

Hence, a system has been described which is capable of producing electric power system control and analysis information as well as protection functions for the system. In one arrangement, the absolute time reference is used to produce a synchronized phasor measurement of voltages and/or currents for current or voltage differential analysis, while in another arrangement, the frequency is combined with frequency estimation techniques and with re-sampling in order to provide information which can be used for other types of protection such as line distance protection.

Although a preferred embodiment of the invention has been disclosed for purposes of illustration, it should be understood that various changes, modifications and substitutions may be made in the embodiment without departing from the spirit of the work, which is defined by the claims which follow.

What is claimed is:

1. A protective relay, comprising:
   an acquisition circuit for obtaining at least one of the following: (1) voltage values and (2) current values, from an electric power system;
   a sampling circuit for sampling the voltage or current values at selected intervals of time, wherein the sampling is based on an absolute time reference; and
   a communication system for transmitting messages containing synchronized phasor values from said protective relay to a host device, said synchronized phasor values being acquired independent of power system frequency.

2. The relay of claim 1, wherein the absolute time reference is provided by a global positioning system.

3. The relay of claim 1, wherein sampling frequency is independent of power system frequency.

4. The relay of claim 1, wherein the acquisition circuits and the sampling circuit use both voltage and current values.

5. The relay of claim 1, wherein the synchronized phasor values transmitted from the protective relay to the host device are positive sequence values.

6. The relay of claim 1, wherein the synchronized phasor values transmitted from the protective relay to the host device are Clarke components.

7. A protective relay using synchronized phasor measurements for protection of electric power systems, comprising:
   an acquisition circuit for obtaining at least one of the following: (1) voltage values and (2) current values, from the power system;
   a sampling circuit for sampling the voltage or current values at selected intervals of time, wherein the sampling is based on an absolute time reference; and
   a calculation system using said sampled signals to produce synchronized voltage or current phasor values and then using said synchronized voltage or current phasor values to perform selected protection functions for the power system, said synchronized voltage and current phasor values being acquired independent of power system frequency.

8. The relay of claim 7, wherein the absolute time reference is provided by a global positioning system.

9. The relay of claim 7, wherein sampling frequency is independent of power system frequency.

10. The relay of claim 7, wherein the acquisition circuits, the sampling circuit and the calculation system use both voltage and current values.

11. The relay of claim 7, wherein the calculation system is responsive to voltage or current values from said protective relay and from another relay which is remote from said protective relay to perform selected protection functions for the power system involving the protective relay and said another relay.

12. The relay of claim 7, including communication means for transmitting messages containing synchronized phasor values from said protective relay to a host computer, wherein the messages contain an absolute time reference indication or a sample number the data being transmitted and the synchronized phasor values for the voltages and currents in the power system for said sample with respect to absolute time.

13. The relay of claim 7, wherein the relay includes a communication circuit responsive to a request from the host computer to report the synchronized phasor values of voltages and currents present on the power system at specified times, wherein the synchronized phasor values from a plurality of protective relays in the power system are used by the host computer to provide an indication of the operating condition of the power system at said specified times.

14. The relay of claim 7, wherein the calculation system uses the absolute time reference information from a remote relay in the power system to align data, including both magnitude and angle, from the local and remote sources thereof, and further uses the aligned magnitude and angle information to perform the protection and/or control functions.

15. The relay of claim 7, wherein the synchronized phasor values produced by the calculation system are positive sequence values.

16. The relay of claim 7, wherein the synchronized phasor values produced by the calculation system are Clarke components.

17. A protective relay using synchronized phasor measurements for protection of electric power systems, comprising:
   an acquisition circuit for obtaining at least one of the following: (1) voltage values and (2) current values, from the power system;
   a sampling circuit for sampling the voltage or current values at selected intervals of time, wherein the sampling is based on an absolute time reference; and
   a calculation system using said sampled signals to produce synchronized voltage or current phasor values and then using said synchronized voltage or current phasor values to perform selected protection functions for the power system, said synchronized voltage and current phasor values being acquired independent of power system frequency, wherein the relay includes a receiving circuit for receiving voltage or current values from another relay which is remote from said protective relay and wherein the calculation system is responsive to the voltage or current values from said protective relay and from said another relay to perform selected protection functions for the power system involving the protective relay and said another relay.

18. The relay of claim 17, wherein the absolute time reference is provided by a global positioning system.

19. The relay of claim 17, wherein sampling frequency is independent of power system frequency.

20. The relay of claim 17, wherein the acquisition circuits and the sampling circuit use both voltage and current values.

21. The relay of claim 17, wherein the synchronized phasor values produced by the calculation system are positive sequence values.

22. The relay of claim 17, wherein the synchronized phasor values produced by the calculation system are Clarke components.

* * * * *

UNITED STATES PATENT AND TRADEMARK OFFICE
CERTIFICATE OF CORRECTION

PATENT NO.    : 6,845,333 B2
DATED         : January 18, 2005
INVENTOR(S)   : Edmund O. Schweitzer III, et al It is certified that error appears in the above-identified patent and that said Letters Patent is hereby corrected as shown below:

<u>Title page,</u>
Item [75], Inventors, first inventor's name should be -- Edmund O. Schweitzer, III -- second inventors name should be -- Luther S. Anderson --; also the last inventors should read as -- Gabriel Benmouyal, Boucherville, Quebec, CANADA --

Signed and Sealed this

Tenth Day of May, 2005

JON W. DUDAS
*Director of the United States Patent and Trademark Office*